United States Patent
Stokes

(12) 
(10) Patent No.: US 10,609,946 B1
(45) Date of Patent: Apr. 7, 2020

(54) PRODUCE CONTAINER WASH AND SANITIZE SYSTEM

(71) Applicant: John Bean Technologies Corporation, Chicago, IL (US)

(72) Inventor: Jonathan Michael Stokes, Clovis, CA (US)

(73) Assignee: John Bean Technologies Corporation, Chicago, IL (US)

( * ) Notice: Subject to any disclaimer, the term of this patent is extended or adjusted under 35 U.S.C. 154(b) by 66 days.

(21) Appl. No.: 15/636,539

(22) Filed: Jun. 28, 2017

(51) Int. Cl.
*A23N 12/02* (2006.01)
*B08B 3/08* (2006.01)

(52) U.S. Cl.
CPC ............... *A23N 12/02* (2013.01); *B08B 3/08* (2013.01)

(58) Field of Classification Search
CPC .... A23N 12/02; A23N 12/023; A23N 12/026; A23N 12/04; A23N 12/06; A47J 43/24; B08B 3/041; B08B 3/044; B08B 3/045; B08B 3/047; B08B 3/08
See application file for complete search history.

(56) References Cited

U.S. PATENT DOCUMENTS

| | | | | |
|---|---|---|---|---|
| 1,401,437 A | * | 12/1921 | Pearson | A23N 12/02 134/67 |
| 2,669,241 A | * | 2/1954 | Foote | A23N 12/02 134/133 |
| 5,622,196 A | * | 4/1997 | Luongo | B08B 3/022 134/131 |

* cited by examiner

*Primary Examiner* — David G Cormier
(74) *Attorney, Agent, or Firm* — Christensen O'Connor Johnson Kindness PLLC

(57) ABSTRACT

A system for liquid treatment of items in a container, includes a first conveyor; a second conveyor separated from the first conveyor and at approximately the same elevation as the first conveyor; a tank positioned between the first and the second conveyors, wherein a top opening of the tank is lower in elevation than the first or second conveyors; and a cradle section positioned between the first and second conveyors, wherein the cradle section includes a cradle having a third conveyor at a lower section and a lever connected to the cradle to lift the cradle to an elevation where the third conveyor is approximately at the elevation of the first and second conveyors and to lower the cradle into the tank.

17 Claims, 7 Drawing Sheets

PRODUCE CONTAINER WASH AND SANITIZE SYSTEM

BACKGROUND

Washing of produce on a small scale, such as occurs at retail groceries, bulk food stores, fresh squeezed juice stores, and the like, creates a number of issues. Usually, the store simply relies on a conventional sink to wash the produce prior to displaying the produce. One of the safety issues created by using a sink is water spillage on the floor. This can pose slipping and falling hazards to the workers in the area. Further, the manual raising and lowering of containers full of produce into and out of sinks can lead to back injuries or crushed feet and toes. Accordingly, there is a need to wash produce on a small scale that eliminates one or more drawbacks with the current methods.

SUMMARY

In an embodiment, a movable system is used for washing and sanitizing fully loaded returnable plastic containers (RPC). The system is able to fit any standard RPC size (e.g., 23.62"×15.75"×3.28" to 11.26") which can be filled with a wide variety of produce. The system allows a worker to load an RPC onto a fold-out roller bed before the wash section. The worker then slides the container into a first cradle section and pulls down on a lever to lower the cradle into a tank of water. While the RPC is in the water, the worker can grade the produce and remove any produce having visual signs of rot or any debris (sticks, leaves, wood, etc.). After the wash step, the worker can raise the lever, and slide the RPC into a second cradle section where the RPC is lowered into a sanitizing solution and maintained in the solution for a time to be determined depending on the solution being used. After the sanitizing step, the RPC is raised and moved to a fold-out roller bed on the opposite end of the tanks. The roller bed on the outlet side is above a drip tray to catch and return any drippage back into the sanitization tank. The RPC can sit on the outlet roller bed to allow drips. Both roller beds before and after the tanks can fold down for storage. The system rides on caster wheels to be moved easily around the customers' facility. The tanks can also have drains on the underside to drain the tanks. The tanks can have a fill spout on the back side of the tank to connect to a hose for filling the tank. The cradle sections can have pull release locks to lock the cradles in the up and down positions for safety. By default, the cradles will stay in the up position using gas springs and will require the worker to pull down on the lever to lower each cradle. The system is not limited to two tanks. The system can be a single, dual, or multi-tank system.

The system is safer to operate than using a standard multi-compartment sink. The system is ergonomic. An RPC, which can weigh around 40 pounds, does not need to be lifted as high as a standard counter sink, which is about 32 to 34 inches from the floor. The use of cradle systems avoids repeated lifting and lowering to minimize back injuries. The system increases productivity because a single worker can be doing a grade on one RPC, while another RPC is in the sanitizing step, and another RPC is in the drying step. A system can also be envisaged with more than one wash tank and more than one sanitizing tank. Having the unit with a fold-out inlet and outlet roller bed allows for the system to be stored without taking up much space. Also, the caster wheels allow the system to be moved around.

It is important that the fruit and produce offered for sale is adequately washed and sanitized before squeezing into fresh juice. Also more stores are starting to use the RPC to display produce on the floor to sell. Companies could benefit from a mobile tank system where RPCs can be sanitized before being put on the floor. This will help keep potentially dangerous pathogens from harming the customers.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

One embodiment of the produce wash and sanitize system 100 (hereafter "system") is illustrated in the FIGURES. While washing and sanitizing are mentioned as representative liquid treatments, the system 100 is useful to apply any liquid treatment to containers filled with items. Further, while the system 100 shows two cradle sections and tanks, other embodiments can have as few as one cradle section and tank, and other embodiments can have more than two cradle sections and tanks.

In the following description, it is useful to describe the system or particular components using descriptors, such as front, back, left, right, upper, lower, and the like. It is to be appreciated that such descriptive words pertain to the FIGURES and in no way imposes limits on the invention, which is defined by the claims.

Figure 1:
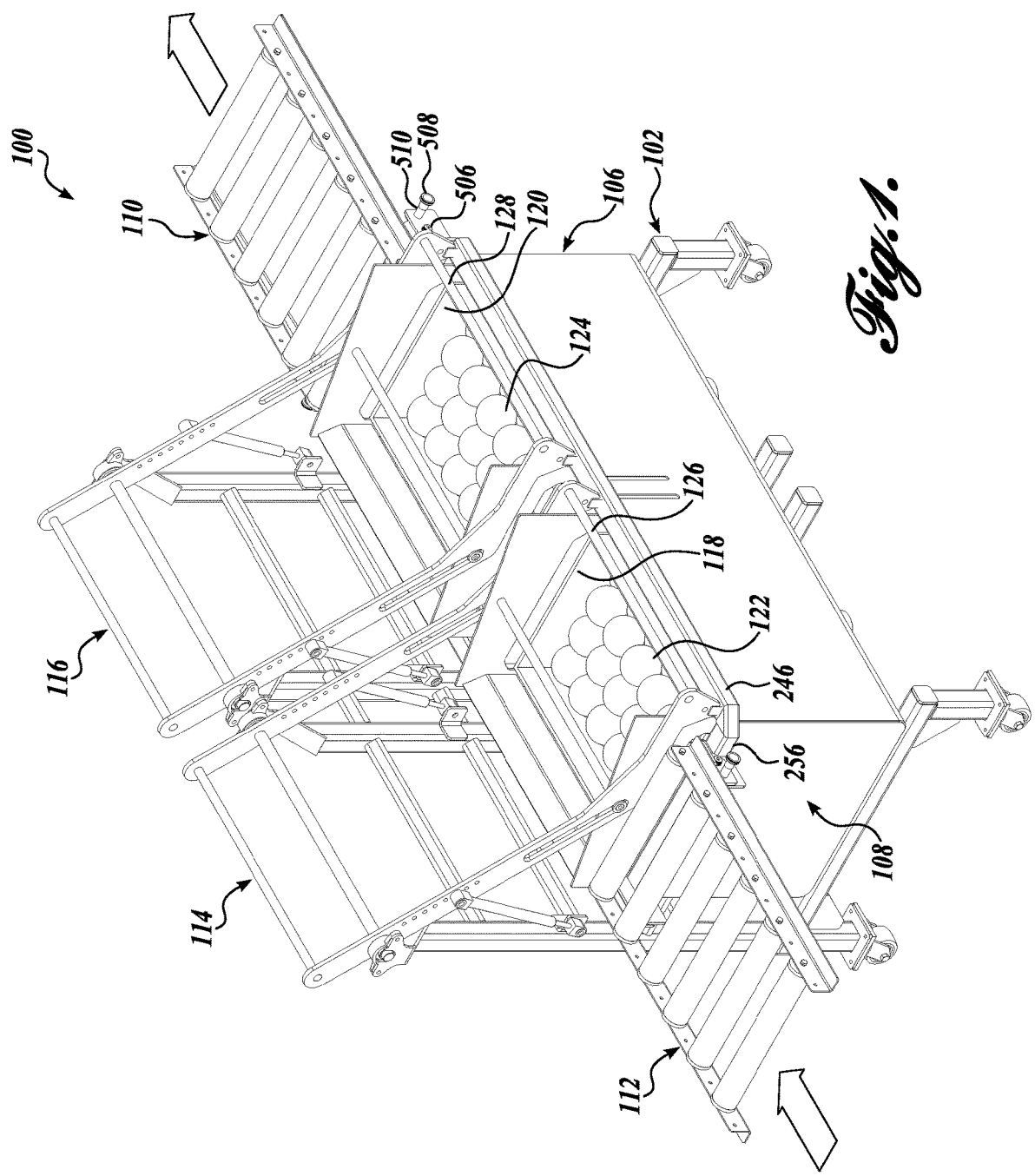
FIG. 1 is a diagrammatical illustration of the front of a produce wash and sanitize system.

FIG. 1 shows the system 100 has major sections, including a steel frame 102, at least one tank 106 or 108, at least one cradle section 114 or 116, a left side (first) roller bed 112, and a right side (second) roller bed 110.

Figure 2:
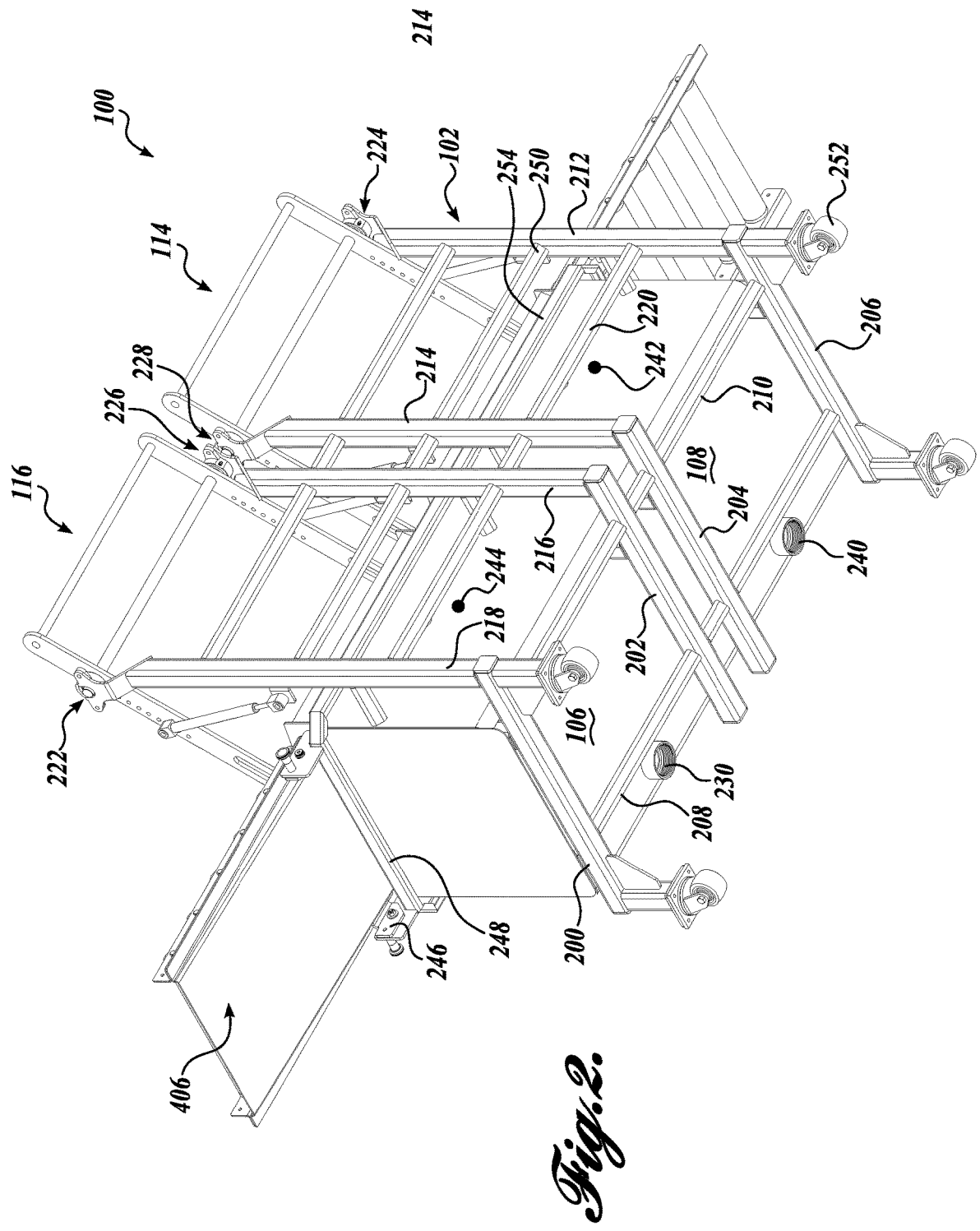
FIG. 2 is a diagrammatical illustration of the back of the produce wash and sanitize system of FIG. 1.

FIG. 2 is used to illustrate the steel frame 102 construction. Although one embodiment of a steel frame is shown and described, it is apparent that alternatives to the frame 102 are readily envisaged. Any frame built that supports one or more tanks, supports one or more cradle sections for each tank, supports the left and right side roller beds, is sufficient.

In FIG. 2, left, right, front, and back conventions remain consistent with FIG. 1. So, FIG. 2 more clearly shows the system 100 from the back. The frame 102 has a front beam 208 and rear beam 210 arranged longitudinally at the bottom of the frame. The front and back bottom beams 208, 210 are separated front to back and connected to each other by four cross beams placed at right angles to the front and back bottom beams 208, 210. The four cross beams include a left side cross beam 206, a right side cross beam 200, a center right cross beam 202, and a center left cross beam 204. The front and back ends of the right and left cross beams 200, 206, approximate the four lower corners of the frame 102. Each corner supports a rolling mechanism, such as caster wheels 252. The back end of the right cross beam 200 is connected to a right vertical beam 218. The back end of the right center cross beam 202 is connected to a right center vertical beam 216. The back end of the left center cross beam 204 is connected to a left center vertical beam 214. The back end of the left cross beam 206 is connected to a left vertical beam 212. Each of the four vertical beams 218, 216, 214, and 212 extend to a height sufficient to support levers as will be described below. Additional longitudinal beams, such as beams 220, 250 may be added at different heights to stiffen the vertical beams 218, 216, 214, and 212. A rectangle frame surrounding the upper edge of tanks 106, 108 is made from back beam 254, right beam 248, front beam 246, and left beam 256 (FIG. 1). As mentioned before, the frame 102 is not particularly limiting, provided the frame is capable of supporting the one or more tanks and the one or more cradle sections. Other structural members besides beams can be used in construction of the frame 102.

As shown in FIG. 1, the frame 102 supports at least one tank, such as tank 106 or tank 108. In one embodiment, a single tank having a divider transversely placed in the interior thereof creates two tanks 106 and 108. In another embodiment, tanks 106 and 108 do not share a wall and are physically separate tanks. Tanks 106 and 108 are open at the top side. The upper edges of the walls of tanks 106 and 108 are at a height so as to allow containers to be moved over and above the tank opening to allow lowering the container in the tank. In one embodiment, each tank 106 and 108 has a bottom drain 230 and 240, respectively. In one embodiment, each tank 106 and 108 has a fill spout 244 and 242, respectively. The two tanks 106 and 108 can contain different liquids and without mixing of the liquids across the tanks. While the description is for a system having two tanks, it should be appreciated that the system is not thereby limited only to two tanks. In some embodiments, the system will include a single tank. In some embodiments, the system will include more than two tanks. Generally, each tank is paired with a cradle section to facilitate lowering and raising a container into and out of the respective tank. In an embodiment, the tanks 106, 108 are placed so that the upper edges that define the opening are lower than the left side roller bed 112 and the right side roller bed 110. Placing the tanks 106, 108 in this manner allows the containers to be rolled from the left side roller bed 112 above the opening of the tank by use of the cradle system. In multiple tank systems, a container can be immersed in various liquid treatments in series. After the last treatment, the container is raised to the height of the right side roller bed 110 to be removed from the system.

Returning to FIG. 1, the system 100 includes a left (first) and right (second) cradle section 114, 116, respectively, for the tanks, 108, 106. The number of cradle sections can naturally depend on the number of tanks or desired liquid treatments, so that one cradle section is used together with one tank. Whether the system 100 is provided with one cradle section or a plurality of cradle sections, the cradle sections are positioned between the left (first) roller bed 112 and the right (second) roller bed 110.

Figure 3:
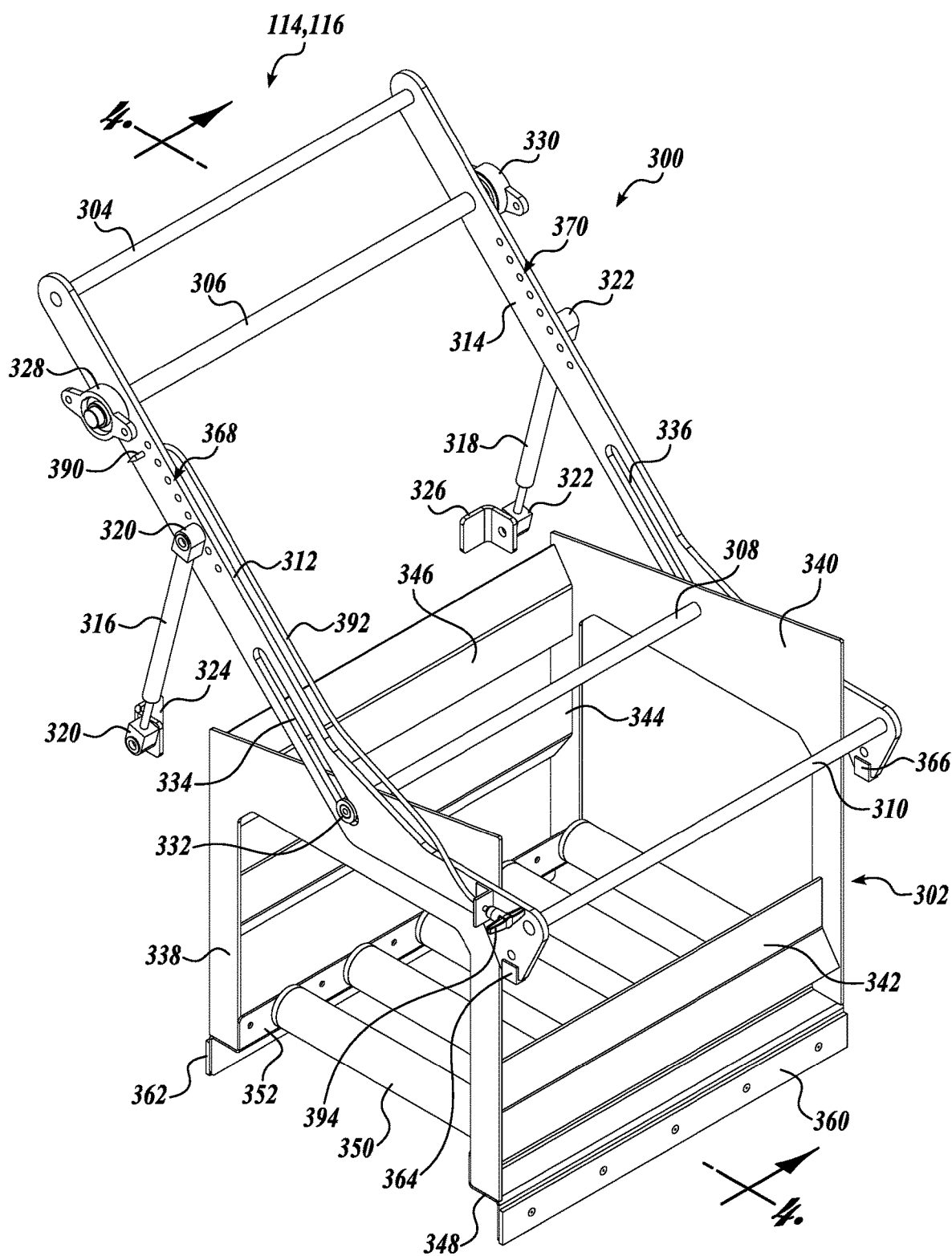
FIG. 3 is a diagrammatical illustration of a cradle section having a cradle and lever.
Figure 4:
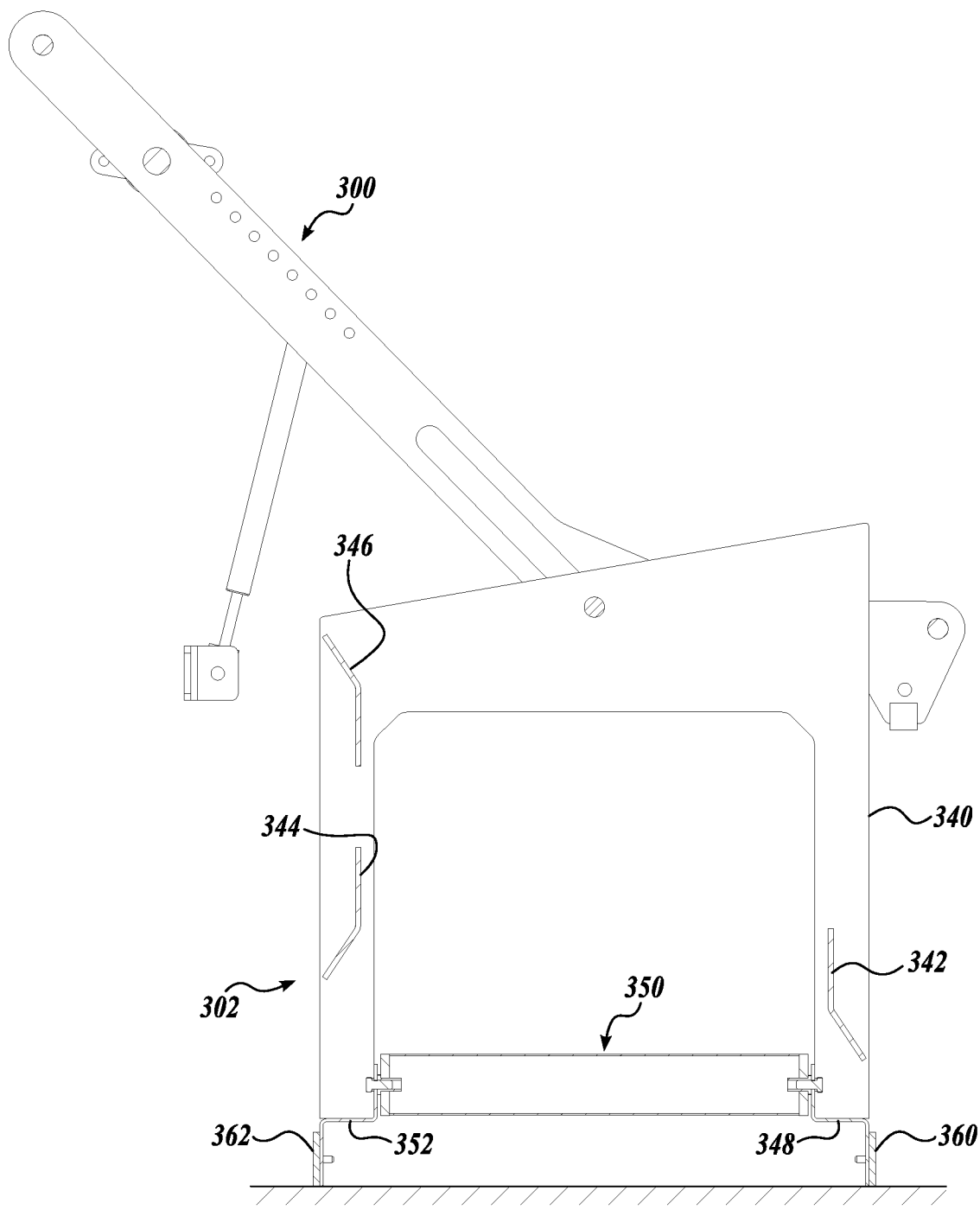
FIG. 4 is a diagrammatical cross-sectional illustration of the cradle section of FIG. 3.

FIGS. 3 and 4 will be used to describe a cradle section in general, such as cradle sections 114 and 116. The cradle sections 114, 116 have two operating parts, the lever 300 and the cradle 302. The cradle 302 supports the produce containers 118, 120, and the lever 300 is used to raise and lower the cradle 302 in and out of the respective tank, 106 or 108. A feature of the cradle 302 is a provision of a roller bed on the bottom of the cradle to support the container, such that containers can be rolled or moved easily through the system 100. For example, containers can be loaded from the left roller bed 112 into cradle section 114, containers can be off-loaded from the right roller bed 110, and containers can be moved easily between cradle sections via the use of roller beds when both cradle sections 114, 116 have a roller bed.

The use of words such as "left," "right," "front," and "back" in describing the cradle 302 and lever 300 are understood to be with reference to FIGS. 3 and 4.

Referring to FIG. 3, in one embodiment, the cradle 302 is a box-like structure that can be symmetrical with respect to a plane that bisects the cradle 302 front to back down the center. The cradle 302 has a left (first) face plate 338 and a right (second) face plate 340 both of similar shape. The left face plate 338 and the right face plate 340 each has a front and back leg extending downwardly. The front and back legs are connected to each other at the upper sides thereof by a top side header piece. The left face plate 338 and the right face plate 340 may be considered as having a square-shaped cutout when viewed straight on, as shown in FIG. 4, thus creating a tunnel through which containers may pass. The dimensions of the cutout can be dictated by the size of the containers contemplated to be used with the system. The left face plate 338 and the right face plate 340 are connected to each other left to right by several bumpers, rods, plates, and the like, so as to keep the left face plate 338 squarely aligned to the right face plate 340.

The length of the connecting bumpers, rods, plates, and the like is such that a container can be fully enclosed within the interior of the cradle 302 (and thus will fit within the tank opening). A front side bumper 342 connects the left face plate 338 to the right face plate 340 at the front side legs near the bottom of the legs. Two back side bumpers 344 and 346 connect the left face plate 338 to the right face plate 340 at the back side legs. As shown in FIG. 4, the bumpers 342, 344, and 346 can be formed from strips of sheet metal with a crease along the length creating a vertical side and an angled side. The bumpers 342, 344, and 346 are positioned such that the vertical sides are placed innermost and face toward the center of the cradle 302. The vertical sides of the bumpers 342, 344, and 346 are seen just inside of the outline of the cutout defined by the left face plate 338 and the right face plate 340 as seen in FIG. 4. Further, the vertical sides of the bumpers 342, 344, and 346 are parallel to each other, thus keeping the produce container centered inside the cradle 302 and when passing into or out of the cradle 302. A bumper may be omitted on the front upper side of the cradle 302 to allow access to the produce container within the cradle 302.

The bottom of the legs of the left face plate 338 are connected to the bottom of the legs of the right face plate 340 by one or more double angled bars 348 and 352 extending left-right in the cradle 302. The double angled bar 348 runs left-right along the lower front of the cradle 302. The double angled bar 352 runs left-right along the lower back of the cradle 302. A double angled bar, such as 348 and 352, has two creases along the length, thus, creating three sides. The double angled bars 348 and 352 provide rigidity to the cradle 302 and also serve to support a roller bed 350. As seen in FIG. 4, double angled bars 348 and 352 have an inside 90 degree crease and an outside 90 degree crease. Thus, the double angled bars 348 and 352 have two vertical sides connected by a horizontal side, wherein the upper vertical side is the innermost side in the cradle 302 and the lower vertical side is the outermost side in the cradle. The outermost vertical side of each double angled bar 348 and 352 can be used to support a slide bar 360 and 362, respectively. The slide bars 360 and 362 are positioned respectively along the length on the outermost front and back of the cradle 302. The slide bars 360 and 362, can be made from a low friction material, such as plastics including NYLON or TEFLON™, and allow the cradle 302 to be raised or lowered in the respective tank 106, 108 without damaging the inside of the tanks 106, 108.

Figure 6:
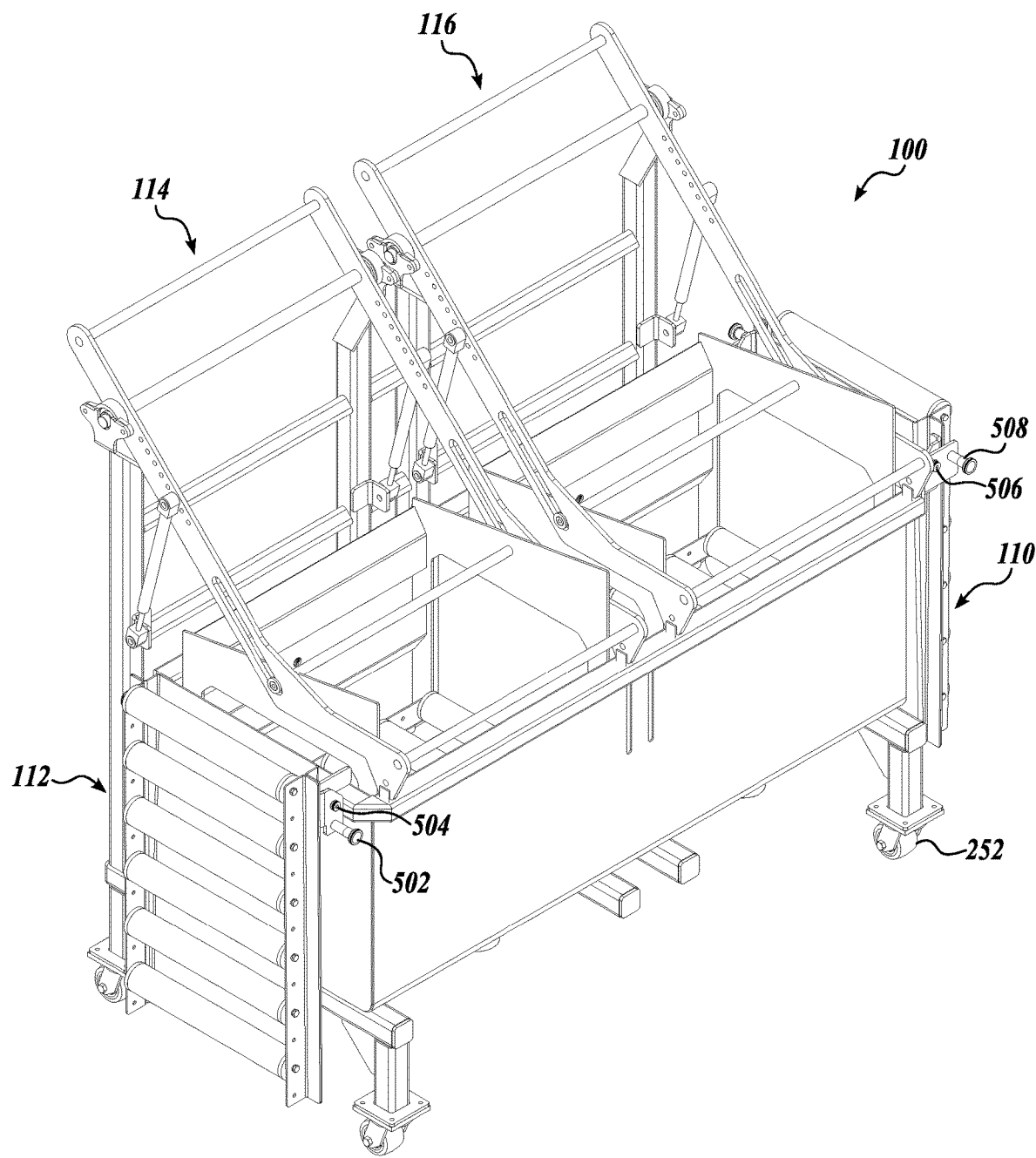
FIG. 6 is a diagrammatical illustration of the produce wash and sanitize system of FIG. 1 in a compact configuration.
Figure 7:
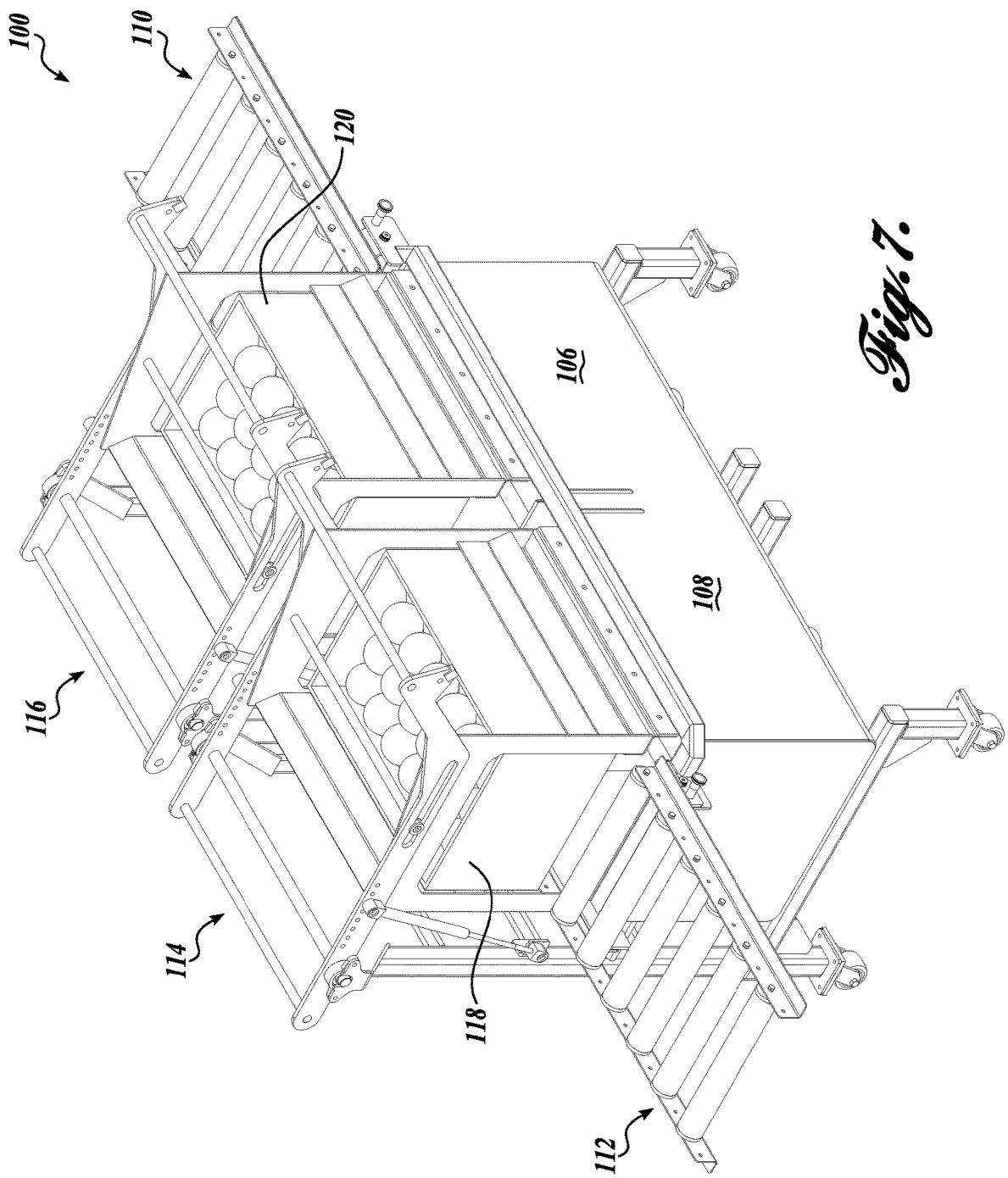
FIG. 7 is a diagrammatical illustration of the produce wash and sanitize system of FIG. 1 with the cradles in the up position.

The upper innermost vertical side of the double angled bars 348, 352 is used to support a plurality of rollers 350. Rollers 350 may have an exterior metal cover and inner ball bearings that rotate around a fixed axle connected between the front double angled bar 348 and the back double angled bar 352. One end of the roller axle may be spring loaded that allows the axle to be pushed in against the spring tension in the axial direction to allow easy replacement of damaged rollers. The same design can apply to other rollers described herein. As shown in FIGS. 6 and 7, the rollers of cradle sections 114, 116 are parallel to the rollers of the left side roller bed 112 and the right side roller bed 110 to allow containers to be moved into and out of the cradle sections 114, 116.

Referring to FIG. 3 again, the cradle sections 114 and 116 include a lever 300 to assist in raising and lowering the cradle 302 and the container supported thereon. The following description applies to the levers of both cradle sections 114, 116.

The lever is designed to raise the cradle to which it is attached to a height so that the roller bed 305 as described above rises to a height that is about level with the left side roller bed 112 and the right side roller bed 110. This allows the container placed on the left side roller bed 112 to be rolled into the first cradle section 114, allows the container from the roller bed of the first cradle section 114 to be rolled into the roller bed of the second cradle section 116, and allows the container to be rolled from the second cradle section 116 to the right side roller bed 110. However, it is possible to move containers from right to left as well.

As with the cradle 302, the lever 300 can be symmetrical with respect to a plane bisecting the lever 300 front to back down the center. The lever 300 includes a left side (first) arm 312 and a right side (second) arm 314. Left arm 312 has ball bearing and housing 328 placed distally toward the back of the arm 312. Right arm 314 has a ball bearing and housing 330 placed distally toward the back of the arm 314. The bearings 328 and 300 act as a fulcrum for the lever arms 312, 314, respectively. For each cradle section 114, 116, the two arms of the lever 300 are connected to the frame 102 via the two ball bearing and housings. Specifically, the left arm of cradle section 114 is connected to the frame's left vertical beam 212 at 224 of FIG. 2. The right arm of cradle section 114 is connected to the frame's left center vertical beam 214 at 228 of FIG. 2. The left arm of cradle section 116 is connected to the frame's right center vertical beam 216 at 226 of FIG. 2. The right arm of cradle section 116 is connected to the frame's right vertical beam 218 at 222 of FIG. 2.

Returning to FIG. 3, in one embodiment, arms 312 and 322 are constructed from flat metal bar. However, the shape of the arms 312 and 322 is not limiting so long as the lever function of raising and lowering the cradle 302 is achieved. The left arm 312 and right arm 322 of each lever of each cradle section 114, 116 is connected to the frame 102 as described above, wherein such connection to the frame 102 is the most distal from the front side of the cradle. The next most distal connection on the arms 312, 314 is to a gas spring. A gas spring is connected to arms 312 and 314 and to the frame 102 to assist in lowering or raising the cradle. Arm 312 is connected to gas spring 316 at upper pivot 320, and arm 314 is connected to gas spring 318 at upper pivot 322. Spring 316 is connected to the frame 102 through lower pivot 320 and bracket 324. Spring 318 is connected to the frame 102 through lower pivot 322 and bracket 326. Because each cradle section 114, 116 has two arms, each gas spring 316, 318 will be connected to one of the frame's vertical beams 212, 214, 216, and 218, as seen in FIG. 2. The gas springs 316, 318 connect to the frame 102 at a lower elevation on the vertical beam compared to the main support bearing higher up, as seen in FIG. 2. Each gas spring 316, 318 has a gas-filled cylinder that applies an outward force on the piston. The arms 312 and 314 have a series of holes 368, 370, respectively, arranged in a line. The holes allow the gas springs to be connected at various elevations to either increase or decrease the purchase on the lever arms 312, 314. That is, the gas springs 316, 318 apply a rotational force on the arms 312, 314 around the bearings 328, 330, which counteracts the weight of the cradle 302 and the container contained therein. By moving the upper pivot connections 320, 322 closer to the bearings 328, 330, that is, closer to the fulcrum, the lever purchase is reduced, while moving the pivot connections 320, 322 away from the bearings 328, 330, that is, lower down on the arms and away from the fulcrum, the lever purchase is increased.

Each arm 312, 314 includes a sliding connection to the left face plate 338 and right face plate 340 of the cradle 302. The sliding connections are more proximate than the gas spring connections. Particularly, a "sliding connection" includes a fixed connection centered midpoint on the header side of each face plate 338, 340, while the connection to the arms 312, 314 is allowed to move over a distance. The sliding connection 322 and a connection not shown on the right face plate 340 bear the weight of the cradle 302 and the container. The sliding connection 322 and the connection not shown on the right face plate 340 are tied via connecting rod 308. Generally, the sliding connection part fixed to the face plates 338, 340 can be a spool-type connection that slides up and down in the respective channel 334 and 336 of the arms 312, 314, respectively. However, other sliding type connections are envisaged. In operation and as the lever 300 is rotated around its fulcrum manually and assisted by the gas spring to raise the cradle 302, the sliding connection 332 moves distally (toward the fulcrum) within its channel 334, while the cradle 302 itself is lifted straight up. As the sliding connections move in the respective channels, the purchase on the lever changes. As the sliding connection moves distally toward the fulcrum point, the lever purchase caused by the cradle weight decreases until a tipping point is reached. At the tipping point, the lever purchase by the cradle weight balances the lever purchase by the gas spring. Continued distal movement of the sliding connection toward the fulcrum point decreases the lever purchase caused by the cradle weight compared to the lever purchase of the gas spring, and the cradle remains suspended. A stop can be included in the lever 300 to prevent the lever 300 from rising above the point where the rollers on the cradles 114, 116 are about even with the left side roller bed 112 and the right side roller bed 110.

While one embodiment has been described for setting the spring 316, 318 force to maintain the cradle down when the cradle is manually moved down and maintain the cradle up when the cradle is manually moved up beyond the "tipping point," the spring force can be greater such that the springs 316, 318 will raise the cradle with little to no manual assistance. The embodiment in which cradles go to the "raised" position is to lessen the possibility of injuries, such as through pinching. Referring again to FIG. 3, in an embodiment where the gas springs' 316, 318 force overcomes the weight of cradle 302 and any container therein, the lever 300 is fitted with a locking mechanism to keep the cradle 302 locked in the down position. One embodiment of the locking mechanism includes a spring-loaded detent 390 placed near the distal end of the lever arm 312. The detent can be a pin biased outward that engages a corresponding hole in the frame 102, for example. The detent 390 is connected to a handle 394 via a cable 392, such as a Bowden cable. The handle 394 can be locked by twisting to avoid accidental release. Turning the handle 394 and then pulling the handle 394 disengages the detent 390 and allows the cradle 302 to be lifted by the springs 316, 318 with little or no manual assistance. When the cradle 302 is pushed downward, the detent 390 engages the corresponding hole and can reset the handle 394. While two embodiments are given as examples of setting the gas spring force, in other embodiments, the springs' 316, 318 force can be set so that in lifting the cradle 302 there is no tipping point, or the cradle 302 is not raised entirely by the springs 316, 318.

A connecting rod 310 useful as a lifting handle connects the proximate end (the front end) of the arms 314, 316 to each other. Further, a connecting rod 304 connects the arms 314, 316 at the distal end (at the back end) of the arms 314, 316.

The proximal end of each arm 314 and 316 (the front ends) are provided with a shock absorbing foot 364, 366, respectively, on the underside of the proximal end of each arm 312, 316. Shock absorbing feet 364, 366 are made from materials such as rubber. As shown in FIG. 1, the shock absorbing feet of the cradle sections 114, 116 rest on the top side of the front horizontal beam 246 of the frame 102 to stop the downward motion of the cradles.

Referring to FIG. 1, the system 100 includes a left side (first) roller bed 112 and a right side (second) roller bed 110 separated from each other to allow at least one tank and one cradle system to be placed between the two roller beds 112, 110. "First" and "second" are only used to distinguish the left side roller bed 112 from the right side roller bed 110. First and second do not denote any specific sequence or order in the system. If ordering is intended, the left side roller bed 112 can be termed "first" and the right side roller bed 112 can be termed "last" or vice versa, since either side can be used for loading or unloading, with the appropriate modifications, such as providing a drip pan in the unloading side. Similarly, where systems include more than the left side and right side roller beds 112, 110, such as including roller beds for each cradle section, the use of "first," "second," "third," and "fourth" do not imply a specific sequence or order. If ordering is intended, roller beds on cradle sections 114, 116 can be called "middle" roller beds, because they are between the left side and right side roller beds 112, 110. While roller beds are depicted on the frame and cradle sections, other conveyors are possible, such as endless loop chains or wire-reinforced conveyors. The left side roller bed 112 and the right side roller bed 110 are generally configured to be horizontal to the ground, but in some cases may be inclined to use gravity assist in the forward motion of containers placed thereon or to prevent containers from rolling in an unintended direction. Alternatively, the roller beds can include mechanical stops to prevent containers from rolling off the roller beds and falling to the ground. Both the left side roller bed 112 and the right side roller bed 110 are similar in construction, however, the right side roller bed 110 includes an additional drip pan to collect liquids and return the liquid to the tank 106.

Figure 5:
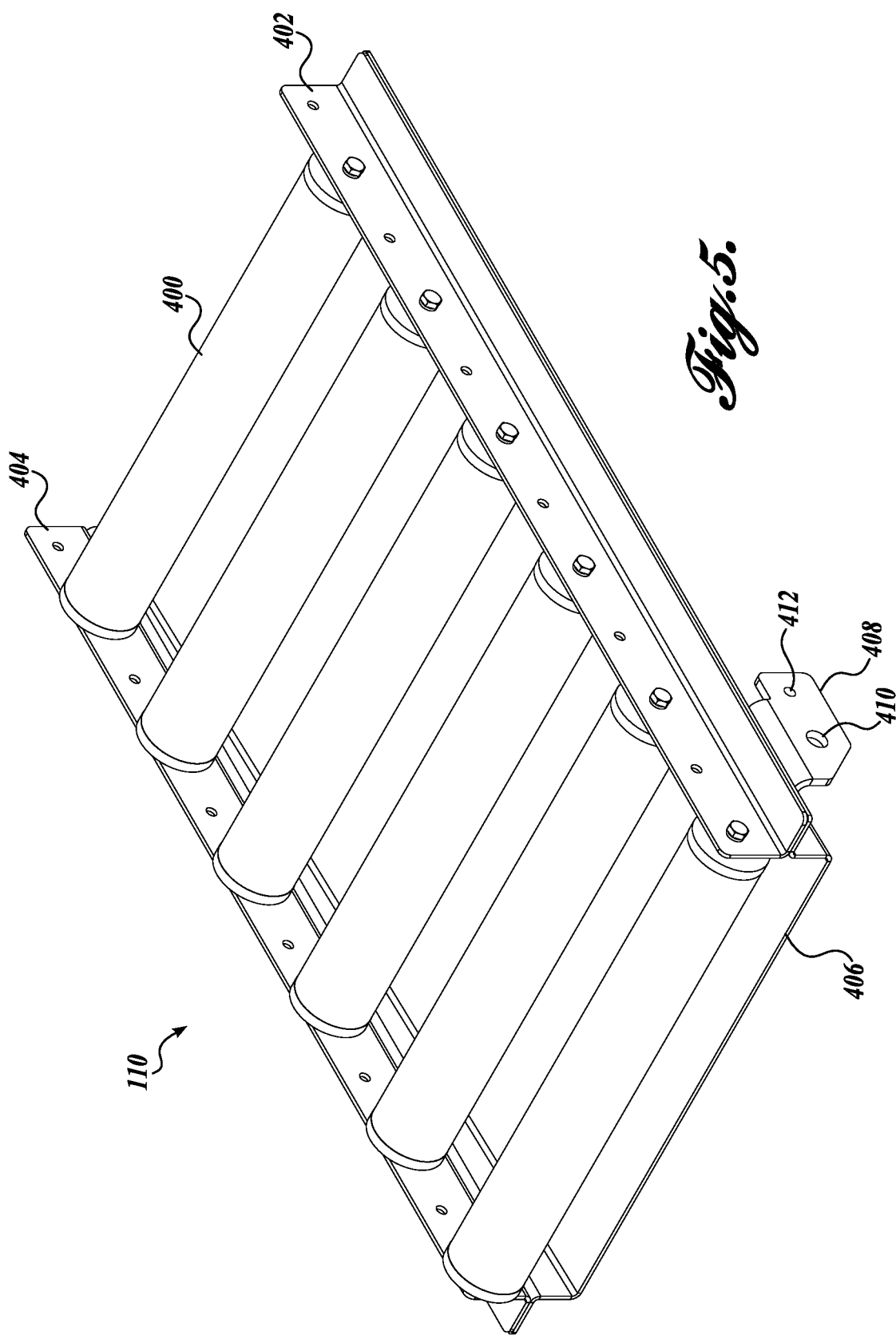
FIG. 5 is a diagrammatical illustration of a roller bed.

Referring to FIG. 5, the right side roller bed 110 will be described in more detail. It is to be appreciated that the left side roller bed 112 can be similar, except for differences explained herein. In one embodiment, the right side roller bed 110 is constructed from a front angle bar 402, and a back angle bar 404 is connected in parallel to each other through a drip pan 406. An angle bar, such as angle bars 402, 404, are creased to result in two flat sides of metal at a right angle to each other. In the roller bed 110, the angle bars 402, 404 are placed to have a vertical side on the inside. The rollers 400 are then connected to the vertical sides of angle bars 402, 404. As described before, a roller 400 can have a continuous outer metal cylinder, a plurality of ball bearings on the inside which rotate on an axle connecting the angle bars 402, 404. The right side roller bed 110 includes the drip pan 406, which is connected to the underside of the horizontal sides of angle bars 402, 404. For this purpose, the drip pan 406 can have a horizontal side on the front and back that can be welded to or bolted to the horizontal side of the angle bars 402, 404. The drip pan 406 is shallower at the right side end and deeper at the left side end, so that any liquids dripping from containers will return to the tank. A drip pan need not be provided on the left side roller bed 112, assuming that the left side is used for loading the containers to be washed and the right side is used for offloading the washed containers.

Both the left side roller bed 112 and the right side roller bed 110 are provided with a mechanism that allows the roller beds to fold down to a vertical position for storage and fold up to a horizontal position for use. The folding mechanism includes cooperating components on the roller beds and the frame. In one embodiment, the right side roller bed includes a lug piece 408 projecting downwardly and perpendicular to the horizontal side of the angle bar 402. A similar lug piece at the back that is not visible is located on the horizontal side of the angle bar 404. The lug 408 includes a first hole 410 and a second hole 412. Referring to FIG. 1, the frame 102 includes a lug 510 projecting to the right located beneath the roller bed 110. The lug 510 includes a pivoting fastener 506 that connects to the hole 410 on the lug 408 (from FIG. 5). The second hole 412 on lug 408 receives a spring-loaded locking pin 508 (from FIG. 1), for example. Thus, when the locking pin 508 engages the hole 412, the roller bed 110 is held in the horizontal position, while when the locking pin 508 is disengaged from hole 412, the roller bed 110 rotates downward about the pivoting fastener 506. This reduces the overall length dimension for easier storage when the system is not in use. See FIG. 6 for a view of the system in the stowed configuration. While a folding mechanism is described for one side of the roller bed 110, it is to be appreciated that similar mechanisms can be provided on the opposite side and on the left side roller bed 112.

The system 100 provides a method of cleaning, washing, sanitizing, or applying other liquid treatments for items 122 or 124, such as produce, in containers 118 or 120. While the system 100 is shown with a first 114 and second 116 cradle section, systems can be built with a single cradle section or more than one cradle section depending on the application. A method will be described for using the first cradle 114 for washing and the second cradle 116 for sanitizing, however, the invention is not thereby limited.

Referring to FIG. 6, the system 100 is shown in its stowed configuration. In the stowed configuration, the system 100 can be moved to a desired location by rolling the system 100 on casters 252. When in the desired location, the left side roller bed 112 and the right side roller bed 110 is rotated from the lowered configuration into the upright configuration and locked into place by engaging the locking pins 502 and 508 in the respective locking holes on the roller beds. FIG. 7 shows the system 100 in operation when the cradle sections 114 and 116 have the cradles in the raised position. In the raised position, the cradle sections 114, 116 have the roller beds (350 in FIG. 3) at or near the same elevation as the left side roller bed 112 and the right side roller bed 110. Therefore, the containers 118 and 120 can be manually rolled from the left side roller bed 112 into and out of the cradles of cradle sections 114 and 116 in series. When within the cradle of cradle section 114 or 116, the container 118 or 120 is lowered by use of the lever into the respective tank 108 or 106 to be washed, sanitized, or treated in any other manner.

In one embodiment, produce washing may be performed in the first cradle section 114 and tank 108, and sanitizing may be performed in the second cradle section 116 and tank 106. Washing liquids in tank 108 may include water, diluted alcohols, acids or alkalis, surfactants, detergents, or mixtures thereof. Sanitizing liquids in tank 106 may include aqueous mixtures with acidified sodium chlorite, carbonic acid, chlorine dioxide, peroxyacetic acid, quaternary ammonium chloride, and the like. The washing and sanitizing liquids may be changed after every wash cycle by draining the tanks 108, 106 via the tank drains 240, 230 and refilling via the tank fill spouts 242, 244. The exact protocols for washing and sanitizing may vary according to the produce or chemical application. After the last cradle section, the containers are rolled onto the right side roller bed 110, where the containers can be immediately taken off or allowed to drain for a period of time. The liquid dripping from the container resting on roller bed 100 will be diverted back to the tank 106 by the drip pan 406 (FIG. 4).

In an embodiment, in addition to or in the alternative of using the first tank 108 for washing, the tank 108 can be used as a grading station for grading produce or other items. Grading is a process including, but not limited to, removing produce that is defective in one or more ways. For example, produce can be discarded based on coloration, broken skin, bruising, and other characteristics that are unappealing in produce. In addition, grading can also include removing debris, such as leaves, twigs, dirt, stones, and the like. Grading produce in a tank of water is effective, as organic debris, such as leaves and twigs will float to the surface making visual identification and removal easy, while inorganic debris, such as dirt and stones will sink in the water and be removed when the water is drained.

A representative embodiment is a system 100 for liquid treatment of items 122 or 124 in a container 118 or 120, comprising a first conveyor 112, a second conveyor 110 separated from the first conveyor and at approximately the same elevation as the first conveyor, a tank 108 or 106 positioned between the first and the second conveyors, wherein a top opening of the tank is lower in elevation than the first or second conveyors, and a cradle section 114 or 116 is positioned between the first and second conveyors, wherein the cradle section includes a cradle 302 having a third conveyor 350 at a lower section and a lever 300 connected to the cradle to lift the cradle to an elevation where the third conveyor is approximately at the elevation of the first and second conveyors and to lower the cradle into the tank. In an embodiment, the first, second, and third conveyors comprise a roller bed.

In an embodiment, a second tank 106 is positioned between the first 112 and the second 110 conveyors, wherein a top opening of the second tank is lower in elevation than the first or second conveyors; and a second cradle section 116 is positioned between the first and second conveyors, wherein the second cradle section includes a second cradle having a fourth conveyor at a lower section and a second lever connected to the second cradle to lift the second cradle to an elevation where the fourth conveyor is approximately at the elevation of the first and second conveyors and to lower the second cradle into the second tank.

In an embodiment, the first 108 and second 106 tanks share at least one wall.

In an embodiment, the system 100 comprises a frame 102 supporting the tank, cradle section, and the frame further having rolling means 252 on a lower section thereof.

In an embodiment, the first 112 and second 110 conveyors rotate between a lowered position to a raised position, wherein in the lowered position, a length dimension of the system 100 is reduced compared to the raised position. In an embodiment, either the first 112 or second 110 conveyor has a drip pan 406 that directs drips to the tank.

In an embodiment, the lever 300 includes a spring 316 or 318 that applies a purchase on the lever that counteracts the weight of the cradle. In an embodiment, the spring force is set so that the cradle remains in a lowered position when manually lowered and the cradle remains in a raised position when manually raised. In an embodiment, the spring force is set so that the cradle is raised by the spring force with little to no manual assistance, and a locking mechanism can be used to keep the cradle in the lowered position.

In an embodiment, the lever 300 includes an adjustment 368 for an amount of purchase provided by the lever. In an embodiment, the adjustment 368 includes a series of holes in line.

In an embodiment, the cradle 302 includes a first 338 and second 340 face plate cutout to allow passage of a container, the first and second face plates are connected to each other via one or more angled metal sheets 342, 344, or 346.

In an embodiment, the lever 300 includes a first 312 and second arm 314 connected respectively on opposite sides of the cradle 302 via a sliding connection 332 and 334, and the first and second arms are connected to a frame 102 supporting the tank.

In an embodiment, a method of treating items 112 or 124 in a container 118 or 120 with a liquid treatment comprises:

placing the container on a first conveyor 112 that is at approximately the same elevation as a second conveyor 110 separated from the first conveyor, moving the container from the first conveyor to a cradle 302 having a third conveyor 350 that is positioned at approximately the same elevation as the first conveyor, with a lever 300 connected to the cradle, lowering the cradle and container into a liquid filled tank, with the lever, raising the cradle and container from the liquid filled tank to a position where the third conveyor is approximately the same elevation as the second conveyor, and moving the container from the cradle to the second conveyor.

In an embodiment, the liquid filled tank includes a washing liquid or a sanitizing liquid.

In an embodiment, the method further comprises resting the container on top of the second conveyor to catch drips and return the drips to the liquid filled tank.

In an embodiment, the first 112, second 110, and third 350 conveyors comprise a roller bed.

In an embodiment, the method further comprises, before placing the container on the first conveyor, rotating the first conveyor 112 from a lowered position to a raised position, and before moving the container from the cradle to the second conveyor 110, rotating the second conveyor from a lowered position to a raised position.

In an embodiment, the method further comprises, after raising the cradle and container from the liquid filled tank to a position where the third conveyor is approximately the same elevation as the second conveyor and before moving the container from the cradle to the second conveyor, moving the container to a second cradle having a fourth conveyor that is positioned at approximately the same elevation as the second conveyor, and with a second lever lowering the second cradle and container into a second liquid filled tank, then, with the second lever raising the second cradle and container from the second liquid filled tank to a position where the fourth conveyor is approximately the same elevation as the second conveyor.

In an embodiment, the first liquid filled tank contains a washing liquid, and the second liquid filled tank contains a sanitizing liquid.

In an embodiment, a system comprises a first conveyor 112 separated from a second conveyor 110, both being placed at about the same elevation, a tank 108 or 106 placed between the first and second conveyor, and a cradle section 114 or 116 configured to raise and lower a container into the tank, the cradle section further including a cradle 302 with a conveyor on a lower section thereof and a lever 300 connected to the cradle.

While illustrative embodiments have been illustrated and described, it will be appreciated that various changes can be made therein without departing from the spirit and scope of the invention.

The embodiments of the invention in which an exclusive property or privilege is claimed are defined as follows:

1. A system for liquid treatment of items in a container, comprising:
   a first conveyor;
   a second conveyor separated from the first conveyor and at approximately the same elevation as the first conveyor;
   a tank positioned between the first and the second conveyors, wherein a top opening of the tank is lower in elevation than the first or second conveyors; and
   a cradle section positioned between the first and second conveyors, wherein the cradle section includes:
     a cradle having a third conveyor at a lower section; and
     a lever connected to the cradle to lift the cradle to an elevation where the third conveyor is approximately at the elevation of the first and second conveyors and to lower the cradle into the tank, wherein the lever comprises a lever arm connected to a fulcrum on one end, the lever arm has a manual lifting handle on an opposite end, and between the fulcrum and the lifting handle, the lever arm is connected to a sliding connection on the cradle, wherein as the lever arm is raised the cradle is raised, and as the lever arm is lowered the cradle is lowered.

2. The system of claim 1, wherein the first, second, and third conveyors comprise a roller bed.

3. The system of claim 1, comprising:
   a second tank positioned between the first and the second conveyors, wherein a top opening of the second tank is lower in elevation than the first or second conveyors; and
   a second cradle section positioned between the first and second conveyors, wherein the second cradle section includes:
     a second cradle having a fourth conveyor at a lower section; and
     a second lever connected to the second cradle to lift the second cradle to an elevation where the fourth conveyor is approximately at the elevation of the first and second conveyors and to lower the second cradle into the second tank, wherein the second lever comprises a second lever arm connected to a second fulcrum on one end, the second lever arm is connected to a second manual lifting handle, and between the second fulcrum and the second lifting handle, the second lever arm is connected to a second sliding connection on the second cradle, wherein as the second lever arm is raised the second cradle is raised, and as the second lever arm is lowered the second cradle is lowered.

4. The system of claim 3, wherein the first and second tanks share at least one wall.

5. The system of claim 3, further comprising roller beds for the first, second, third, and fourth conveyors, wherein the second lever arm rotates in a front to back plane of the system, and the roller beds rotate in a side to side plane of the system.

6. The system of claim 1, comprising a frame supporting the tank, cradle section, and the frame further having rolling means on a lower section thereof.

7. The system of claim 1, wherein the first and second conveyors rotate between a lowered position to a raised position, wherein in the lowered position, a length dimension of the system is reduced compared to the raised position.

8. The system of claim 1, wherein either the first or second conveyor has a drip pan that directs drips to the tank.

9. The system of claim 1, wherein the lever includes a spring that applies a purchase on the lever that counteracts the weight of the cradle.

10. The system of claim 1, wherein the lever includes an adjustment for an amount of purchase provided by the lever.

11. The system of claim 10, wherein the adjustment includes a series of holes in line.

12. The system of claim 1, wherein the cradle includes a first and second face plate cutout to allow passage of a container, the first and second face plates are connected to each other via one or more angled metal sheets.

13. The system of claim 1, wherein the lever includes a second lever arm connected on a second side of the cradle via a second sliding connection, wherein the second lever arm is connected to a second fulcrum on one end, the second lever arm is connected to the manual lifting handle on an opposite end, and between the second fulcrum and the lifting handle, the second lever arm is connected to a second sliding connection on the cradle.

14. The system of claim 13, wherein the second lever arm has a second channel between the second fulcrum and the lifting handle, the second sliding connection slides within the second channel of the second lever arm as the second lever arm is raised and lowered to raise and lower the cradle.

15. The system of claim 1, wherein the lever arm has a channel between the fulcrum and the lifting handle, the sliding connection slides within the channel of the lever arm as the lever arm is raised and lowered to raise and lower the cradle.

16. The system of claim 1, further comprising roller beds for the first, second, and third conveyors, wherein the lever arm rotates in a front to back plane of the system, and the roller beds rotate in a side to side plane of the system.

17. A system, comprising:
   a first conveyor separated from a second conveyor, both being placed at about the same elevation;
   a tank placed between the first and second conveyor; and
   a cradle section configured to raise and lower a container into the tank, the cradle section further including a cradle with a conveyor on a lower section thereof and a lever connected to the cradle, wherein the lever comprises a lever arm connected to a fulcrum on one end, the lever arm has a manual lifting handle on an opposite end, and between the fulcrum and the lifting handle, the lever arm is connected to a sliding connection on the cradle, wherein as the lever arm is raised the cradle is raised, and as the lever arm is lowered the cradle is lowered.

\* \* \* \* \*